US012644966B2

(12) United States Patent
Han et al.

(10) Patent No.: US 12,644,966 B2
(45) Date of Patent: Jun. 2, 2026

(54) LIDAR DEVICE

(71) Applicant: HL KLEMOVE CORP., Incheon (KR)

(72) Inventors: Hak Gu Han, Gyeonggi-do (KR); Ho Seok Shin, Gyeonggi-do (KR); Chulseung Lee, Gyeonggi-do (KR); Seong Hee Jeong, Gyeonggi-do (KR); Yun Ki Han, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 901 days.

(21) Appl. No.: 17/919,254

(22) PCT Filed: Apr. 16, 2021

(86) PCT No.: PCT/KR2021/004824
§ 371 (c)(1),
(2) Date: Oct. 15, 2022

(87) PCT Pub. No.: WO2021/210954
PCT Pub. Date: Oct. 21, 2021

(65) Prior Publication Data
US 2023/0161003 A1 May 25, 2023

(30) Foreign Application Priority Data
Apr. 16, 2020 (KR) ........................ 10-2020-0046050

(51) Int. Cl.
*G01S 7/481* (2006.01)
*G01S 7/484* (2006.01)
(Continued)

(52) U.S. Cl.
CPC ............. *G01S 7/4811* (2013.01); *G01S 7/484* (2013.01); *G01S 7/4861* (2013.01); *G02B 5/09* (2013.01)

(58) Field of Classification Search
CPC ...... G01S 7/4811; G01S 7/484; G01S 7/4861; G01S 7/4815; G01S 7/4817; G01S 17/42;
(Continued)

(56) References Cited

U.S. PATENT DOCUMENTS

2018/0341009 A1* 11/2018 Niclass ................. G01S 7/4817
2019/0265337 A1* 8/2019 Zhang ..................... G01S 17/10
(Continued)

FOREIGN PATENT DOCUMENTS

JP        2010-107448        5/2010
KR    10-2015-0061330        6/2015
(Continued)

OTHER PUBLICATIONS

Office Action dated Jan. 20, 2025 for Korean Patent Application No. 10-2022-7034871 and its English translation provided by Applicant's foreign counsel.
(Continued)

*Primary Examiner* — Michael E Teitelbaum
(74) *Attorney, Agent, or Firm* — WOMBLE BOND DICKINSON (US) LLP

(57) ABSTRACT

A LIDAR device is disclosed. A LIDAR device according to one embodiment of the present invention comprises: a laser unit; and a scanner unit, wherein the laser unit comprises: a first laser module for emitting and receiving a laser in a first direction; and a second laser module, disposed in a stacked form with the first laser module, for emitting and receiving a laser in a second direction, wherein the scanner unit comprises: a first polygon mirror which is rotated and has a plurality of mirrors which reflect the laser emitted from the first laser module and the laser received by the first laser module; and a second polygon mirror which is disposed in a stacked form with the first polygon mirror and rotated integrally with the first polygon mirror, and has a plurality
(Continued)

11 : 111, 112
12 : 121, 122
21 : 211, 212, 213, 214
22 : 221, 222, 223, 224 of mirrors which reflect the laser emitted from the second laser module and the laser received by the second laser module.

9 Claims, 4 Drawing Sheets

(51) Int. Cl.
  *G01S 7/4861*        (2020.01)
  *G02B 5/09*         (2006.01)
(58) Field of Classification Search
  CPC ...... G01S 17/87; G01S 17/931; G01S 7/4814;
            G02B 5/09; G02B 26/12; Y02A 90/10
  See application file for complete search history.

(56) References Cited

U.S. PATENT DOCUMENTS

| | | | |
|---|---|---|---|
| 2019/0294176 A1* | 9/2019 | Ozbilgin | G06V 20/56 |
| 2020/0064483 A1* | 2/2020 | Li | G01S 13/867 |
| 2020/0150238 A1* | 5/2020 | Smith | G01S 7/4912 |

FOREIGN PATENT DOCUMENTS

| | | |
|---|---|---|
| KR | 10-1603533 | 3/2016 |
| KR | 10-1674062 | 11/2016 |
| KR | 10-2018-0126963 | 11/2018 |
| KR | 10-2018-0126964 | 11/2018 |
| KR | 10-2019-0011497 | 2/2019 |

OTHER PUBLICATIONS

International Search Report for PCT/KR2021/004824 mailed on Aug. 6, 2021 and its English Translation by WIPO (now published as WO 2021/210954).
Written Opinion of the International Searching Authority for PCT/KR2021/004824 mailed on Aug. 6, 2021 and its English Machine Translation by Google Translate (now published as WO 2021/210954).

* cited by examiner

11 : 111, 112
12 : 121, 122
21 : 211, 212, 213, 214
22 : 221, 222, 223, 224

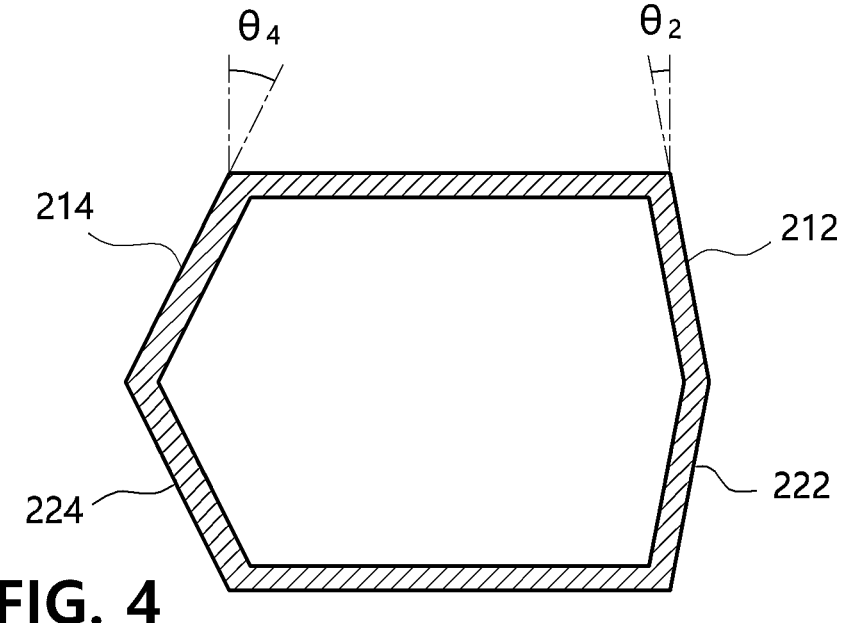
FIG. 4
FIG. 5
| Sa | | High Power Output/ High Sensitivity |
|---|---|---|
| Sb | | Low Power Output/ Low Sensitivity |
FIG. 6

111 : 111a, 111b, 111c, 111d
11 : 111, 112
12 : 121, 122
21 : 211, 212, 213, 214
22 : 221, 222, 223, 224

LIDAR DEVICE

CROSS-REFERENCE TO RELATED APPLICATIONS

This application is the U.S. National Stage of International Patent Application No. PCT/KR2021/004824 filed on Apr. 16, 2021, which claims priority to and the benefit of Korean Patent Application No. 10-2020-0046050, filed on Apr. 16, 2020, the disclosure of which is incorporated herein by reference in its entirety.

TECHNICAL FIELD

The present invention relates to a LIDAR device, and more specifically to a LIDAR device including a laser emitting/receiving module and a scanner having a polygon mirror on a rotating body.

BACKGROUND ART

Recently, LIDAR (Light Detection And Ranging), which is a laser radar device, has been widely used to detect surrounding terrain or objects in automobiles, mobile robots or the like.

The LIDAR device emits pulsed laser light into the atmosphere and uses a reflector or scatterer to measure the distance, object or atmospheric phenomenon, and it calculates the time of reflected light as a clock pulse and has a resolution of 5 m at the frequency of 30 MHz and a resolution of 1 m at the frequency of 150 MHz. The LIDAR device irradiates laser light into the surrounding area and uses the time and intensity of the reflected light which is reflected off the surrounding object or terrain to measure the distance, speed and shape of a measurement target, or to precisely measure the surrounding object or terrain.

Since the conventional LIDAR device emits a laser with a wide beam width corresponding to the angle of view and simultaneously acquires reflected light from all directions within the angle of view to obtain a distance from the reflector, a laser module having a very high power output is required, and accordingly, there is a problem in that the size is large and the price is high.

In addition, most of the LIDAR devices having the panoramic scanning function are configured to rotate the entire device including the transmission optical system and the reception optical system. However, if the entire device is rotated, the size of the system becomes larger, which further exacerbates the problems of price and power consumption increases.

Meanwhile, since a LIDAR device used in a vehicle or the like irradiates a laser toward a person, it is required to secure safety associated with the human body, particularly the eyes. Satisfying such safety requirements while minimizing the deterioration of detection performance is emerging as a task related to LIDAR.

(Patent Document) Korean Patent Application No. 10-2015-0061330 "LIDAR SENSOR SYSTEM", published on Jun. 4, 2015

DISCLOSURE

Technical Problem

The present invention has been devised to solve the problems of prior art described above, and an object of the present invention is to provide a LIDAR device which is capable of effectively increasing performance such as vertical resolution and the like.

In addition, another object of the present invention is to provide a LIDAR device that improves the detection performance and also ensures safety for the human body.

Technical Solution

According to an aspect of the present invention, provided is a LIDAR device, including a laser unit; and a scanner unit, wherein the laser unit includes a first laser module for emitting and receiving a laser in a first direction; and a second laser module, disposed in a stacked form with the first laser module, for emitting and receiving a laser in a second direction, and wherein the scanner unit includes a first polygon mirror which is rotated and has a plurality of mirrors which reflect the laser emitted from the first laser module and the laser received by the first laser module; and a second polygon mirror which is disposed in a stacked form with the first polygon mirror and rotated integrally with the first polygon mirror, and has a plurality of mirrors which reflect the laser emitted from the second laser module and the laser received by the second laser module.

In this case, the first laser module may be disposed above the second laser module.

In addition, the first laser module may have a higher laser output than the second laser module.

In addition, the first laser module may include a laser light source with a higher power output than the second laser module.

In addition, the first laser module may include a plurality of laser light sources compared to the second laser module.

In addition, the first laser module may have a higher laser reception sensitivity than the second laser module.

In addition, the first laser module may have a wider optical entrance than the second laser module.

In addition, the first laser module may include a detector with multiple channels compared to the second laser module.

In addition, a plurality of polygon mirrors provided in the first polygon mirror may be arranged to have different inclination angles with respect to the vertical direction, and a plurality of polygon mirrors provided in the second polygon mirror may be arranged to have different inclination angles with respect to the vertical direction.

In addition, a plurality of polygon mirrors provided in the first polygon mirror may be arranged such that the inclination angle with respect to the vertical direction is gradually decreased or increased in the rotation direction, and a plurality of polygon mirrors provided in the second polygon mirror may be arranged such that the inclination angle with respect to the vertical direction is gradually decreased or increased in the rotation direction.

Advantageous Effects

According to an exemplary embodiment of the present invention, it is possible to efficiently improve the vertical resolution of the LIDAR device through a scanner unit that is provided with polygon mirrors which are disposed to be stacked and rotated integrally.

In addition, according to an exemplary embodiment of the present invention, by configuring any one or more of the laser output and reception sensitivity of the laser module arranged in multiple layers differently, it is possible to simultaneously achieve the safety of the LIDAR device on the human body and the improvement of the detection performance.

DESCRIPTION OF DRAWINGS

FIG. 4 is a cross-sectional view B-B' of the scanner unit of the LIDAR device according to an exemplary embodiment of the present invention.

FIG. 5 is a diagram showing vertical channels of the LIDAR device according to an exemplary embodiment of the present invention.

FIG. 6 is a diagram showing vertical channels implemented by the LIDAR device according to another exemplary embodiment of the present invention.

MODES OF THE INVENTION

Figure 1:
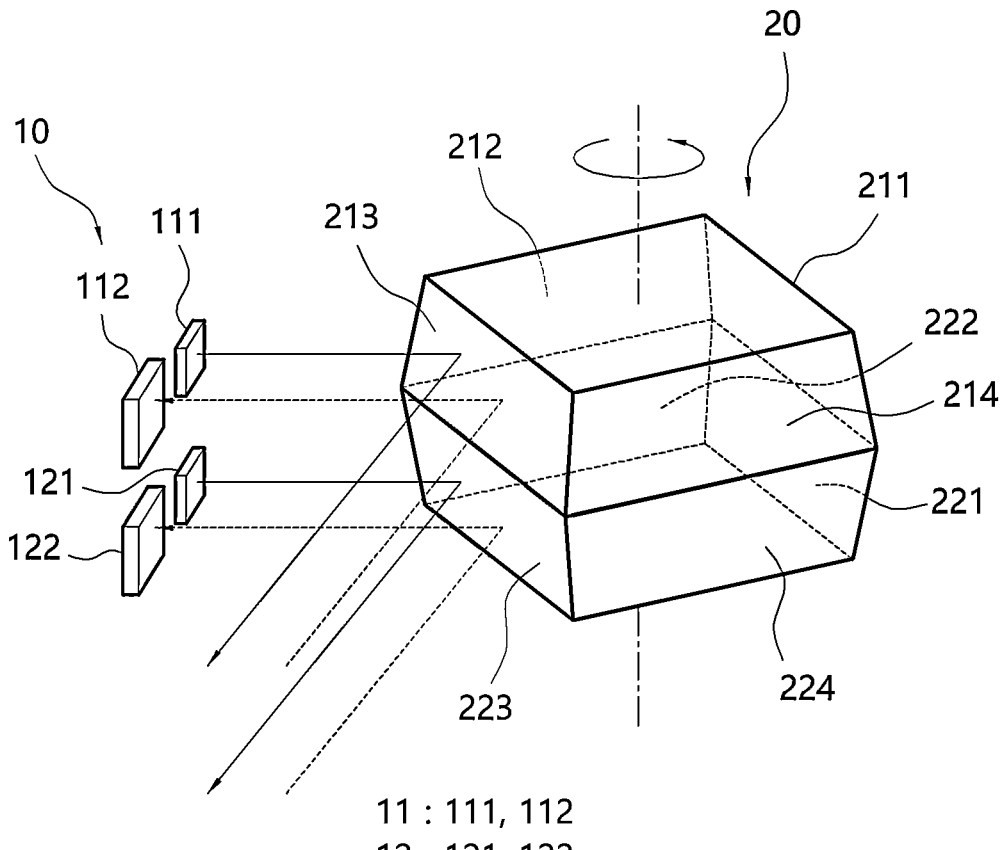
FIG. 1 is a diagram showing the LIDAR device according to an exemplary embodiment of the present invention.

Hereinafter, with reference to the accompanying drawings, the exemplary embodiments of the present invention will be described in detail so that those of ordinary skill in the art can easily practice the present invention. The present invention may be embodied in many different forms and is not limited to the exemplary embodiments described herein. In order to clearly describe the present invention, parts that are irrelevant to the description are omitted from the drawings, and the same reference numerals are assigned to the same or similar components throughout the specification.

In the present specification, terms such as "include" or "have" are intended to designate that a feature, number, step, operation, component, part or combination thereof described in the specification exists, but it should be understood that it does not preclude the possibility of addition or existence of one or more other features or numbers, steps, operations, components, parts or combinations thereof.

FIG. 1 is a diagram showing the LIDAR device according to an exemplary embodiment of the present invention. In addition, FIG. 2 is a plan view of the LIDAR device according to an exemplary embodiment of the present invention.

Figure 2:
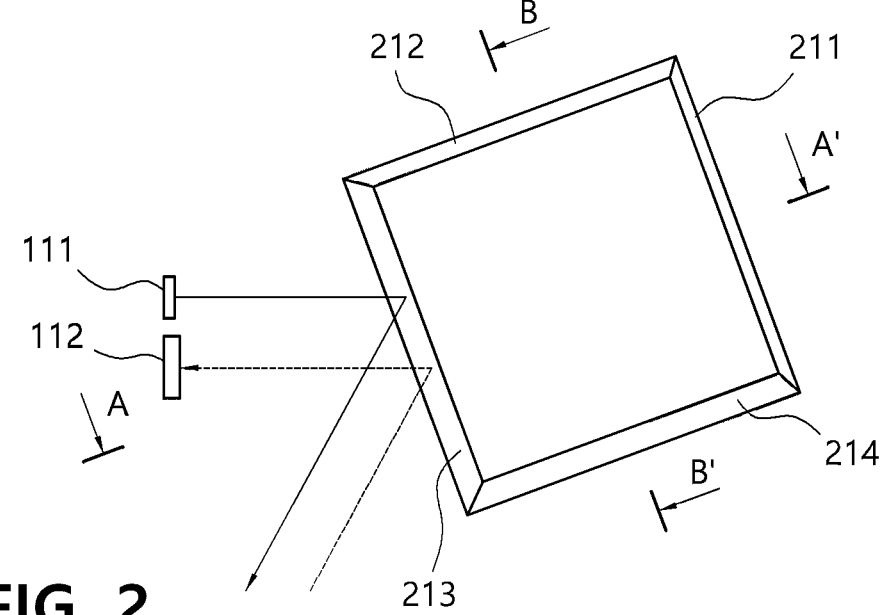
FIG. 2 is a plan view of the LIDAR device according to an exemplary embodiment of the present invention.

Referring to FIGS. 1 and 2, the LIDAR device according to an exemplary embodiment of the present invention includes a laser unit 10 and a scanner unit 20.

In the LIDAR device according to an exemplary embodiment of the present invention, the laser unit 10 is fixedly arranged, and the scanner unit 20 is spaced apart from the laser unit 10 and rotatably arranged about a rotational axis penetrating in the vertical direction. In this case, the rotational axis may be formed while passing through the center of the scanner unit 20. The laser emitted through the laser unit 10 is reflected by the scanner unit 20 and travels to the outside, and the laser reflected by an external object and returned to the scanner unit 20 is reflected by the scanner unit 20 and returns to the laser unit 10.

The laser unit 10 includes a first laser module 11 and a second laser module 12. The first laser module 11 emits and receives a laser in a first direction. In addition, the second laser module 12 is disposed in a stacked form with the first laser module 11 to emit and receive a laser in a second direction. In this case, the second direction may be formed parallel to the first direction.

More specifically, in an exemplary embodiment of the present invention, the first laser module 11 is disposed above the second laser module 12. Correspondingly, the first polygon mirror 21 viewed from the back is disposed above the second polygon mirror 22.

In an exemplary embodiment of the present invention, the first laser module 11 includes a first laser light source 111 and a first laser detector 112. In addition, the second laser module 12 includes a second laser light source 121 and a second laser detector 122.

As such, in an exemplary embodiment of the present invention, the first laser module 11 and the second laser module 12 respectively include a pair of light sources and detectors, but as will be described below, in another exemplary embodiment of the present invention, the combination of the light sources and the detectors may be different such that the first laser module 11 and the second laser module 12 have different laser outputs or reception sensitivities, respectively.

Meanwhile, although omitted for the brevity of description, the first laser module 11 and the second laser module 12 may additionally include an optical system such as a lens or the like, which is required in the process of emitting and receiving by a laser light source, respectively.

The scanner unit 20 includes a first polygon mirror 21 and a second polygon mirror 22. In an exemplary embodiment of the present invention, the first polygon mirror 21 and the second polygon mirror 22 are stacked and formed vertically symmetrically with respect to a horizontal plane.

The first polygon mirror 21 is disposed in front of the first laser module 11 and includes and rotates a plurality of mirrors that reflect a laser emitted from the first laser module 11 and a laser received by the first laser module 11. A plurality of mirrors provided in the first polygon mirror 21 may have different inclination angles with respect to the vertical direction.

In an exemplary embodiment of the present invention, the first polygon mirror 21 is formed in four surfaces and includes a total of four mirrors such as a 1-1 mirror 211, a 1-2 mirror 212, a 1-3 mirror 213 and a 1-4 mirror 214.

According to an exemplary embodiment of the present invention, the number of mirrors of the polygon mirror is not limited, and the number may be increased or decreased as necessary.

Meanwhile, in the first polygon mirror 21, the inclination angles of the plurality of mirrors with respect to the vertical direction are gradually decreased or increased in the rotational direction.

Figure 3:
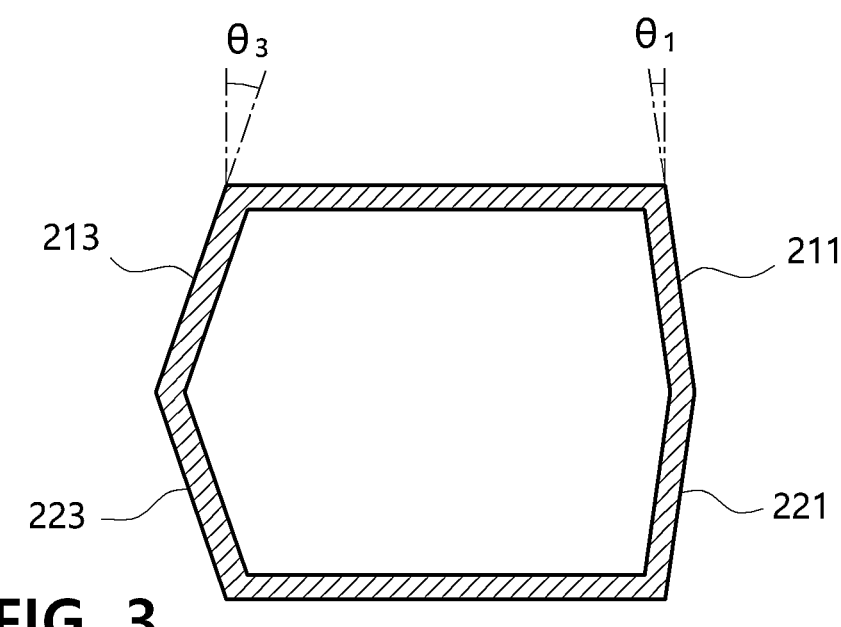
FIG. 3 is a cross-sectional view A-A' of the scanner unit of the LIDAR device according to an exemplary embodiment of the present invention.

FIG. 3 illustrates a cross-sectional view A-A' of the scanner unit of the LIDAR device according to an exemplary embodiment of the present invention, and FIG. 4 illustrates a cross-sectional view B-B' of the scanner unit of the LIDAR device according to an exemplary embodiment of the present invention.

Referring to FIGS. 3 and 4, it can be confirmed that the inclination angle ($\theta$1) of the 1-1 mirror, the inclination angle ($\theta$2) of the 1-2 mirror 212, the inclination angle ($\theta$3) of the 1-3 mirror 213 and the inclination angle ($\theta$4) of the 1-4 mirrors 214 with respect to the vertical direction are configured to increase gradually.

The second polygon mirror 22 is disposed in a stacked form with the first polygon mirror 21 and rotates integrally with the first polygon mirror 21. As described above, the second polygon mirror 22 is disposed below the first polygon mirror 21. The plurality of mirrors provided in the second polygon mirror 22 may have different inclination angles with respect to the vertical direction.

In an exemplary embodiment of the present invention, the second polygon mirror 22 includes a plurality of mirrors that reflect the laser emitted from the second laser module 12 and the laser received by the second laser module 12, and it is configured such that the inclination angles of the plurality of mirrors with respect to the vertical direction are gradually decreased or increased in the rotational direction.

Specifically, in an exemplary embodiment of the present invention, the second polygon mirror 22 is symmetrical with the first polygon mirror 21 with respect to a horizontal plane. Accordingly, the second polygon mirror 22 includes a 2-1 mirror 221, a 2-2 mirror 222, a 2-3 mirror 223 and a 2-4 mirror 224.

In addition, the inclination angle of the 2-1 mirror 221, the inclination angle of the 2-2 mirror 222, the inclination angle of the 2-3 mirror 223 and the inclination angle of the 2-4 mirror 224 with respect to the vertical direction are config- ured to increase gradually, and these angles respectively correspond to the inclination angle ($\theta$1) of the 1-1 mirror 211, the inclination angle ($\theta$2) of the 1-2 mirror 212, the inclination angle ($\theta$3) of the 1-3 mirror 213 and the incli- nation angle ($\theta$4) of the 1-4 mirrors 214 with respect to the vertical direction.

FIG. 5 is a diagram showing vertical channels of the LIDAR device according to an exemplary embodiment of the present invention.

As can be confirmed from FIG. 5, according to the LIDAR device according to an exemplary embodiment of the present invention, four vertical channels (Sa) are formed through the first polygon mirror 21 including the first laser module 11 and four mirrors having different inclined sur- faces, and four vertical channels (Sb) are formed through the second polygon mirror 22 including the second laser module 12 and four mirrors having different inclined surfaces such that it is possible to effectively secure a total of 8 vertical channels.

FIG. 6 is a diagram showing vertical channels imple- mented by the LIDAR device according to another exem- plary embodiment of the present invention.

Referring to FIG. 6, in the LIDAR device according to another exemplary embodiment of the present invention, the vertical channel (Sa) formed by the first laser module 11 and the first polygon mirror 21 may have a high power output or high sensitivity, and the vertical channel (Sb) formed by the second laser module 12 and the second polygon mirror 22 may have a relatively low power output or sensitivity.

In order to implement such different power outputs or reception sensitivities, in the LIDAR device according to another exemplary embodiment of the present invention, the first laser module 11 and the second laser module 12 have different laser outputs from each other or different laser reception sensitivities from each other.

When it is assumed that the LIDAR device according to another exemplary embodiment of the present invention is applied to a vehicle, the first laser module 11 is involved in the detection of the upper front side of the LIDAR device, and thus performs the detection of a vehicle and an object at a long distance. In addition, since the second laser module 12 is involved in the detection of the front lower side of the LIDAR device, it performs the detection of the near field and the ground.

In such a state, it is efficient for the first laser module 11 to have a relatively high laser output and reception sensi- tivity compared to the second laser module 12. In addition, it is possible to secure the safety of the human body because the laser output is not excessively increased as a whole through the power outputs that are different up and down.

From this point of view, in another exemplary embodi- ment of the present invention, it can be assumed that the first laser module 11 is configured to have a higher laser output than the second laser module 12.

Figure 7:
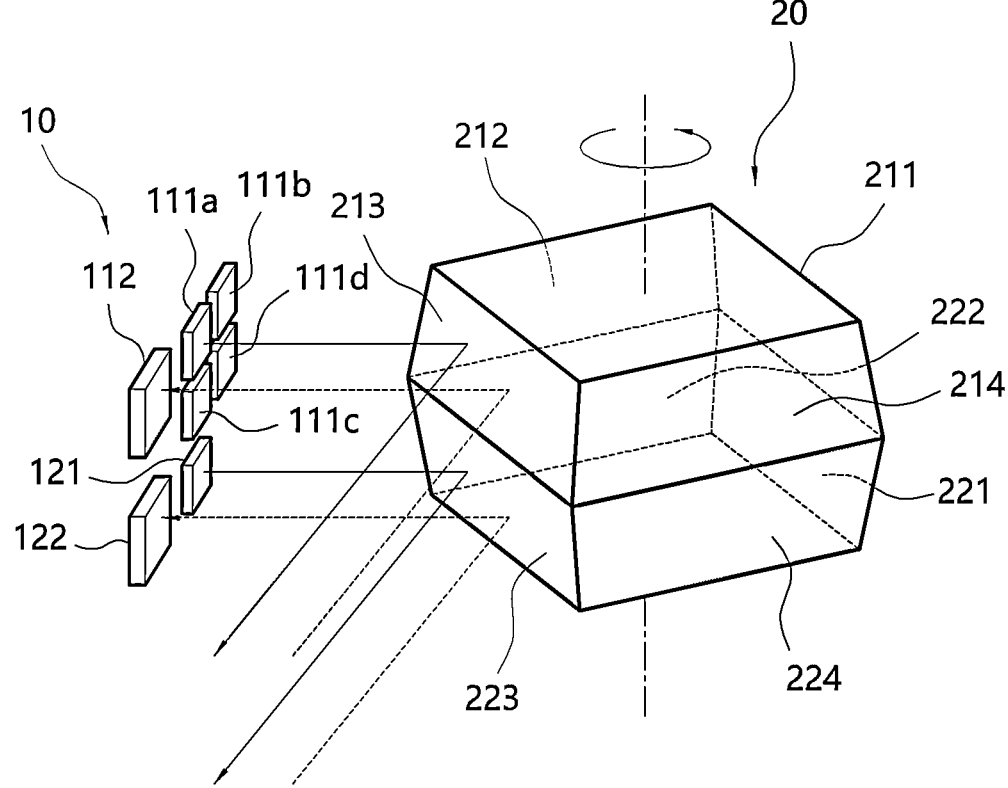
FIG. 7 is a view showing the LIDAR device according to another exemplary embodiment of the present invention.

Specifically, as shown in FIG. 7, the first laser module 11 may include a plurality of laser light sources compared to the second laser module 12. Specifically, the first laser module 11 may include a 1-1 laser light source 111a, a 1-2 laser light source 111b, a 1-3 laser light source 111c and a 1-4 laser light source 111d. In this case, each laser light source may have the same power output.

For example, the 1-1 laser light source 111a, the 1-2 laser light source 111b, the 1-3 laser light source 111c, the 1-4 laser light source 111d and the second laser light source 121 may respectively have a power output of 75 W.

Meanwhile, the first laser module 11 may include a laser light source having a higher power output than the second laser module 12. That is, the first laser module 11 and the second laser module 12 may include the same number of light sources, but the first laser light source 111 of the first laser module 11 may have a high power output, and the second laser module 12 of the second laser light source 121 may have a low power output.

For example, the first laser light source 111 may have a power output of 300 W, and the second laser light source 121 may have a power output of 75 W.

In addition, meanwhile, it may be assumed that the first laser module 11 and the second laser module 11 have different laser reception sensitivities.

Specifically, the first laser module 11 may have a higher laser reception sensitivity than the second laser module 12. To this end, the first laser module 11 may have a wider optical entrance than the second laser module 12, or the first laser module 11 may have a detector with multiple channels compared to the second laser module 12.

For example, the first laser module 11 may have an optical entrance of 1,600 m$^2$ to be suitable for long-distance detec- tion or may have a multi-channel array of 16 channels or more, and the second laser module 12 may have an optical entrance of 400 m$^2$ to be suitable for short-distance detection or may have a multi-channel array of 4 channels or less.

Although an exemplary embodiment of the present inven- tion has been described, the spirit of the present invention is not limited by the exemplary embodiments presented herein, and those skilled in the art who understand the spirit of the present invention will be able to easily suggest other exem- plary embodiments by modifying, changing, deleting or adding components within the scope of the same spirit, but this is also said to be within the scope of the present invention.

The invention claimed is:

1. A LIDAR device, comprising:
a laser unit; and
a scanner unit,
wherein the laser unit comprises:
a first laser module for emitting and receiving a laser in a first direction; and
a second laser module, disposed in a stacked form with the first laser module, for emitting and receiving a laser in a second direction, and
wherein the scanner unit comprises:

a first polygon mirror which is rotated and has a plurality of mirrors which reflect the laser emitted from the first laser module and the laser received by the first laser module; and a second polygon mirror which is disposed in a stacked form with the first polygon mirror and rotated integrally with the first polygon mirror, and has a plurality of mirrors which reflect the laser emitted from the second laser module and the laser received by the second laser module, wherein the first laser module is disposed above the second laser module, the first laser module comprises a first laser light source and a first laser detector disposed side-by-side with the first laser light source at the same height, and the second laser module comprises a second laser light source and a second laser detector disposed side-by-side with the second laser light source at the same height.

2. The LIDAR device of claim 1, wherein the first laser module has a higher laser output than the second laser module.

3. The LIDAR device of claim 2, wherein the first laser module comprises a laser light source with a higher power output than the second laser module.

4. The LIDAR device of claim 2, wherein the first laser module comprises a plurality of laser light sources compared to the second laser module.

5. The LIDAR device of claim 1, wherein the first laser module has a higher laser reception sensitivity than the second laser module.

6. The LIDAR device of claim 5, wherein the first laser module has a wider optical entrance than the second laser module.

7. The LIDAR device of claim 5, wherein the first laser module comprises a detector with multiple channels compared to the second laser module.

8. The LIDAR device of claim 1, wherein a plurality of polygon mirrors provided in the first polygon mirror are arranged to have different inclination angles with respect to the vertical direction, and a plurality of polygon mirrors provided in the second polygon mirror are arranged to have different inclination angles with respect to the vertical direction.

9. The LIDAR device of claim 8, wherein a plurality of polygon mirrors provided in the first polygon mirror are arranged such that the inclination angle with respect to the vertical direction is gradually decreased or increased in the rotation direction, and a plurality of polygon mirrors provided in the second polygon mirror are arranged such that the inclination angle with respect to the vertical direction is gradually decreased or increased in the rotation direction.

* * * * *